United States Patent
Locascio et al.

(10) Patent No.: US 12,024,308 B2
(45) Date of Patent: Jul. 2, 2024

(54) PROPELLER DRIVEN BACKUP COOLING PUMP SYSTEM FOR ELECTRIC MOTOR CONVERTER

(71) Applicant: Rolls-Royce Corporation, Indianapolis, IN (US)

(72) Inventors: David Locascio, Indianapolis, IN (US); Michael Dougherty, Indianapolis, IN (US); Stephen Long, Indianapolis, IN (US); Peter Schenk, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 315 days.

(21) Appl. No.: 17/553,756

(22) Filed: Dec. 16, 2021

(65) Prior Publication Data

US 2023/0192309 A1 Jun. 22, 2023

(51) Int. Cl.
| | |
|---|---|
| *B64D 33/08* | (2006.01) |
| *B64D 27/24* | (2024.01) |
| *F04B 17/02* | (2006.01) |
| *F04B 17/03* | (2006.01) |
| *H01M 10/613* | (2014.01) |
| *H01M 10/625* | (2014.01) |
| *B64C 11/00* | (2006.01) |

(52) U.S. Cl.
CPC ............. *B64D 33/08* (2013.01); *B64D 27/24* (2013.01); *F04B 17/02* (2013.01); *F04B 17/03* (2013.01); *H01M 10/613* (2015.04); *H01M 10/625* (2015.04); *B64C 11/002* (2013.01)

(58) Field of Classification Search
CPC ......... B64D 33/08; B64D 27/24; F04B 17/02; F04B 17/03; H01M 10/613; H01M 10/625; B64C 11/002
See application file for complete search history.

(56) References Cited

U.S. PATENT DOCUMENTS

| 5,105,875 A | 4/1992 | McArthur | |
|---|---|---|---|
| 5,271,248 A * | 12/1993 | Crowe | ................... H02K 9/197 |
| | | | 62/505 |
| 8,424,285 B2 | 4/2013 | Veilleux | |

(Continued)

FOREIGN PATENT DOCUMENTS

| EP | 2774853 A1 * | 9/2014 | ............. B64D 33/08 |
|---|---|---|---|
| JP | 2012139056 A * | 7/2012 | |

OTHER PUBLICATIONS

EP-2774853-A1_translate (Year: 2014).*
JP-2012139056-A_translate (Year: 2012).*

*Primary Examiner* — Tulsidas C Patel
*Assistant Examiner* — Mohammed Ahmed Qureshi
(74) *Attorney, Agent, or Firm* — Barnes & Thornburg LLP

(57) ABSTRACT

A propulsion system for an aircraft includes a propeller assembly, a controller, and a pump system. The propeller assembly includes a propeller and a power system, the power system including an electric motor and a motor converter. The controller is connected to the power system and configured to switch the power system into a power-off arrangement in response to a temperature of the motor converter being greater than a threshold temperature. The pump system includes a pump and a coolant circuit that cools the motor converter. The pump is coupled to the propeller and to the motor such that rotation of either drives the pump.

20 Claims, 4 Drawing Sheets

(56) References Cited

U.S. PATENT DOCUMENTS

| | | |
|---|---|---|
| 10,794,617 B2 | 10/2020 | Moxon |
| 10,960,785 B2 | 3/2021 | Villanueva et al. |
| 10,995,656 B2 | 5/2021 | Noderer et al. |
| 11,128,251 B1* | 9/2021 | Solodovnik ............. H02P 25/22 |
| 2017/0081040 A1 | 3/2017 | Pal |
| 2019/0181633 A1* | 6/2019 | Nozawa .................. H02P 29/68 |
| 2020/0271061 A1 | 8/2020 | Kopeschke et al. |
| 2021/0162884 A1 | 6/2021 | Villanueva et al. |
| 2021/0194395 A1* | 6/2021 | Yamada .................... H02P 5/74 |

* cited by examiner

PROPELLER DRIVEN BACKUP COOLING PUMP SYSTEM FOR ELECTRIC MOTOR CONVERTER

FIELD OF THE DISCLOSURE

The present disclosure relates generally to propulsion systems, and more specifically to propulsion systems including electric propulsion components.

BACKGROUND

Propulsion units that produce thrust for an aircraft via electrically driven fans or propellers are being explored as alternatives for conventional, pure-combustion driven engines. The incorporation of electrically-driven propulsion units in aircraft provide a number of opportunities for optimizing overall aircraft design and maneuverability. For example, entirely battery-powered propeller-driven aircraft and entirely turbo-electric aircraft have been considered.

Electric engines may include a propulsion system having a propeller driven by an electric motor that is governed by a motor converter. A pump system may also be provided to pump coolant through a cooling circuit through the motor converter to remove heat therefrom. In certain scenarios, air may become ingested and lodged in the circuit, causing the motor converter to overheat. If the motor converter overheats, the motor converter may cease to function, which would subsequently cause the motor to stop driving the propeller.

SUMMARY

The present disclosure may comprise one or more of the following features and combinations thereof.

According to the present disclosure, a propulsion system for an aircraft includes a propeller assembly, a controller, and a pump system. The propeller assembly includes a propeller configured to rotate around a central axis and a power system, the power system including an electric motor mechanically coupled to the propeller and configured to drive the propeller, and a motor converter electrically connected to the electric motor and configured to deliver electric power to the electric motor.

In some embodiments, the controller is connected to the power system and configured to switch the power system into a power-off arrangement in which the motor converter is powered off and blocked from delivering the electric power to the electric motor in response to a temperature of the motor converter being greater than a predetermined threshold temperature. The pump system includes a pump and a coolant circuit, the pump configured to pump coolant through the motor converter via the coolant circuit so as to cool the motor converter. The pump is mechanically coupled to the propeller and to the electric motor such that rotation of any one of the propeller and the electric motor drives the pump such that rotation of the propeller drives the pump to move the coolant through the coolant circuit and lower the temperature of the motor converter to less than the predetermined threshold temperature in response to the motor converter being in the power-off arrangement during operation of the propulsion system.

In some embodiments, the motor converter includes a plurality of converter switches configured to regulate incoming and outgoing current and a cooling plate thermally engaged with the plurality of converter switches and configured to remove heat from the plurality of converter switches. The coolant circuit is arranged so as to thermally engage with the cooling plate in order to remove heat from the cooling plate which subsequently removes heat from the plurality of converter switches. In response to the power system being in the power-off arrangement, the pump system is configured to pump the coolant through the coolant circuit so as to remove heat from the cooling plate which subsequently removes heat from the plurality of converter switches In some embodiments, the pump system further includes an expansion tank in fluidic communication with the coolant circuit. The pump system is configured to, in response to air bubbles accumulating within the coolant circuit and moving at a reduced speed past the cooling plate, move the air bubbles through the coolant circuit away from the cooling plate and into the expansion tank.

In some embodiments, the motor converter further includes at least one temperature sensor located proximate the plurality of converter switches so as to monitor a temperature of the plurality of converter switches.

In some embodiments, the temperature of the motor converter utilized by the controller is the temperature of the plurality of converter switches. The predetermined threshold temperature utilized by the controller is a predetermined threshold temperature of the plurality of converter switches.

In some embodiments, the predetermined threshold temperature of the plurality of converter switches is 150 degrees Celsius.

In some embodiments, the propeller includes a plurality of blades and the propeller assembly further includes a propeller governor configured to control a pitch angle of the plurality of blades. In response to the controller switching the power system into the power-off arrangement, the propeller governor is configured to change the pitch angle of the plurality of blades of the propeller from a first pitch angle to a second pitch angle different from the first pitch angle.

In some embodiments, the second pitch angle enables the propeller to continue to rotate at a maximum rotational speed in the power-off arrangement so as to continue to drive the pump for a maximum amount of time.

In some embodiments, the propulsion system further includes a gearbox mechanically coupled to the propeller and to the pump system and the gearbox is configured to transfer mechanical energy from the propeller to the pump of the pump system so as to drive the pump.

In some embodiments, the coolant is one of a water and ethylene glycol mixture and a water and propylene mixture.

In some embodiments, the pump is a positive displacement pump configured to provide a constant flow of coolant in response to a constant rotational speed of the propeller.

According to another aspect of the present disclosure, a propulsion system for an aircraft includes a propeller assembly, a controller, and a pump system. The propeller assembly includes a propeller configured to rotate around a central axis and a power system, the power system including an electric first motor mechanically coupled to the propeller and configured to drive rotation of the propeller, and a motor converter electrically connected to the electric first motor and configured to deliver electric power to the electric first motor.

In some embodiments, a controller is connected to the power system and configured to switch the power system into a power-off arrangement in which the motor converter is powered off and blocked from delivering the electric power to the electric first motor in response to a temperature of the motor converter being greater than a predetermined threshold temperature. The pump system includes a pump and a coolant circuit, the coolant circuit configured to remove heat from the motor converter, the pump configured to pump coolant through the coolant circuit.

In some embodiments, the power system further includes a second motor operably connected to the pump and configured to drive the pump, and wherein the second motor is driven independent of the motor converter.

In some embodiments, the motor converter includes a plurality of converter switches configured to regulate incoming and outgoing current and a cooling plate thermally engaged with the plurality of converter switches and configured to remove heat from the plurality of converter switches. The coolant circuit is arranged so as to thermally engage with the cooling plate in order to remove heat from the cooling plate which subsequently removes heat from the plurality of converter switches. In response to the power system being in the power-off arrangement, the pump system is configured to pump the coolant through the coolant circuit so as to remove heat from the cooling plate which subsequently removes heat from the plurality of converter switches.

In some embodiments, the pump system further includes an expansion tank in fluidic communication with the coolant circuit. The pump system is configured to, in response to air bubbles accumulating within the coolant circuit and moving at a reduced speed past the cooling plate, move the air bubbles through the coolant circuit away from the cooling plate and into the expansion tank.

In some embodiments, the motor converter further includes at least one temperature sensor located proximate the plurality of converter switches so as to monitor a temperature of the plurality of converter switches.

In some embodiments, the temperature of the motor converter utilized by the controller is the temperature of the plurality of converter switches. The predetermined threshold temperature utilized by the controller is a predetermined threshold temperature of the plurality of converter switches.

In some embodiments, the predetermined threshold temperature of the plurality of converter switches is 150 degrees Celsius.

According to another aspect of the present disclosure, a method includes providing a propeller assembly including a propeller and a power system, the propeller configured to rotate around a central axis, the power system including an electric motor and a motor converter, mechanically coupling the electric motor to the propeller, the electric motor being configured to drive the propeller, electrically connecting the motor converter to the electric motor, providing a pump system including a pump and a coolant circuit, and mechanically coupling the pump to the propeller and to the electric motor such that at least one of the propeller and the electric motor drives the pump.

In some embodiments, the method further includes pumping, via the pump, coolant through the motor converter via the coolant circuit so as to cool the motor converter, determining that a temperature of the motor converter is greater than a predetermined threshold temperature, switching the power system into a power-off arrangement in which the electric motor and the motor converter are powered off, and driving the pump via only the propeller such that the coolant continues to pump through the coolant circuit in order to lower the temperature of the motor converter to less than the predetermined threshold temperature during operation of the propulsion system.

In some embodiments, the method further includes determining that the temperature of the motor converter is less than the predetermined threshold temperature, switching the power system into a power-on arrangement in which the motor converter is powered on, and driving the pump via at least the electric motor such that the coolant continues to pump through the coolant circuit.

These and other features of the present disclosure will become more apparent from the following description of the illustrative embodiments.

DETAILED DESCRIPTION OF THE DRAWINGS

Figure 1:
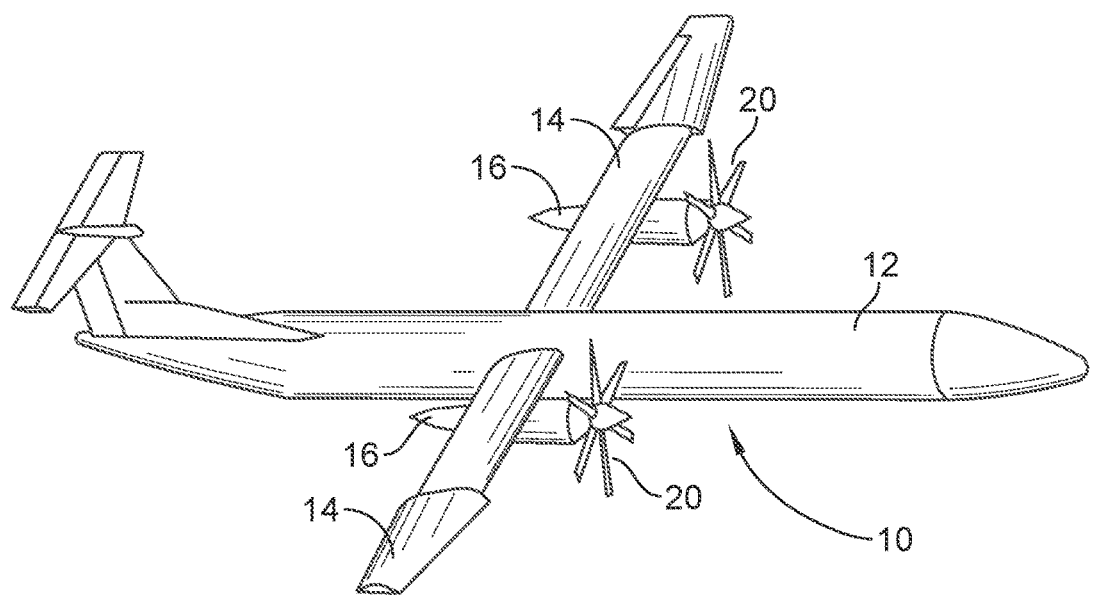
FIG. 1 is a perspective view of an aircraft according to the present disclosure, the aircraft including a fuselage, two wings, and two propulsion systems each coupled to the wings via a pylon, the propulsion systems each including a propeller driven by an electric motor.

For the purposes of promoting an understanding of the principles of the disclosure, reference will now be made to a number of illustrative embodiments illustrated in the drawings and specific language will be used to describe the same.

An aircraft 10 including at least one propulsion system 20 according to the present disclosure is shown in FIG. 1. In the illustrative embodiment, the aircraft 10 may include a fuselage 12 and a pair of wings 14 extending away from the fuselage 12 and configured to generate lift for the aircraft 10. The aircraft 10 further includes a pair of propulsion systems 20, each propulsion system 20 being coupled to an underside of a respective wing 14 via a pylon 16. As suggested in FIG. 2, each propulsion system 20 is configured to provide kinetic energy to a propeller assembly 22 of the propulsion system 20 such that a plurality of blades 24 of the propeller assembly 22 convert the kinetic energy to rotational energy so as to provide propulsive power to the aircraft 10. In other embodiments, there may be greater than or fewer than two propulsion systems 20 coupled to the aircraft 10, such as, for example, two propulsion systems 20 arranged on each wing 14 or a single propulsion system 20 arranged at the nose of the fuselage 12.

Figure 2:
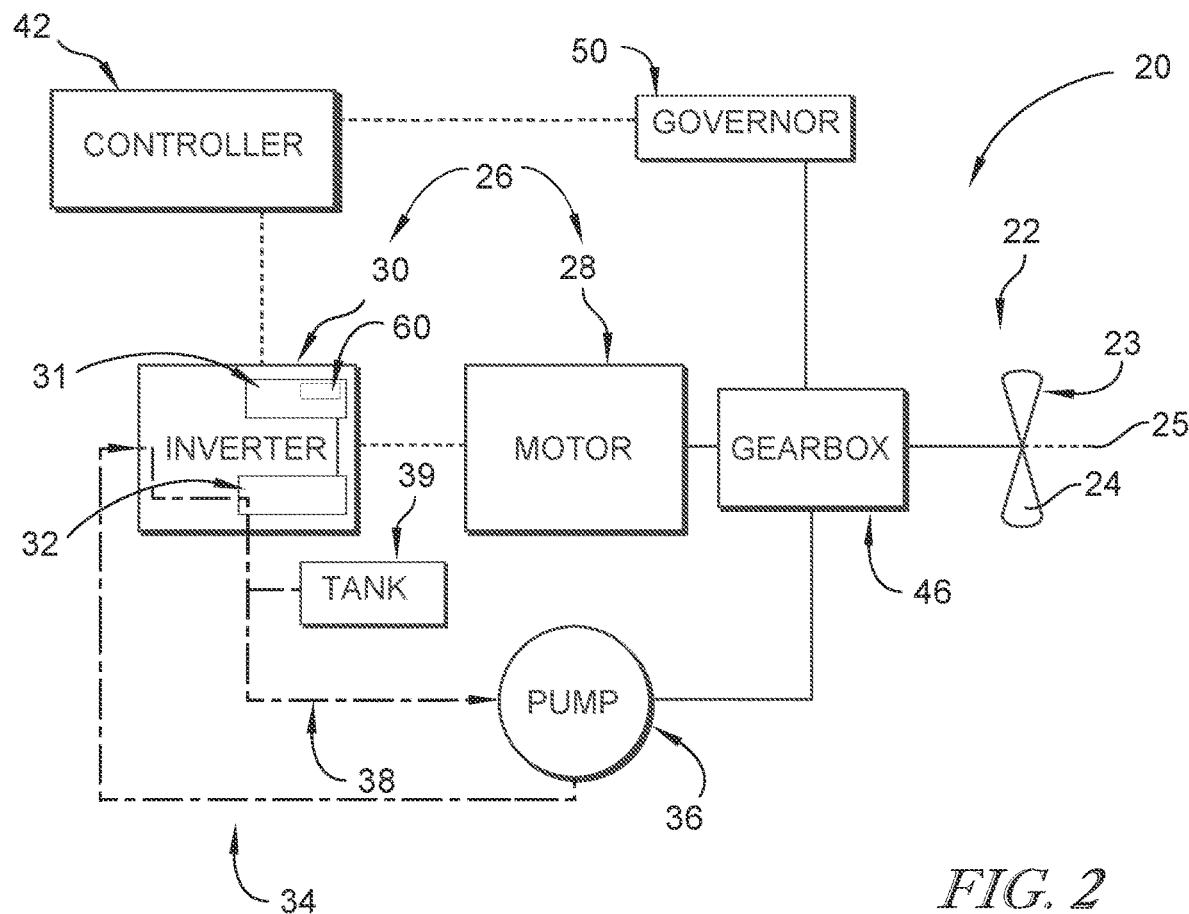
FIG. 2 is a block diagram of the propulsion system of the aircraft of FIG. 1, showing that the propulsion system includes a propeller, a power system including an electric motor mechanically coupled to the propeller and electrically connected to a motor converter, a pump system including a pump and a coolant circuit that cools the motor converter and that is configured to be driven by at least one of the motor and the propeller, a gearbox mechanically coupled to the propeller and to the pump system, and a controller configured to switch off the motor and the converter in response to the temperature of the converter exceeding a threshold temperature such that only the propeller drives the pump and coolant continues to pump through the coolant circuit in order to lower the temperature of the motor converter to less than the threshold temperature.

The propulsion system 20 includes the propeller assembly 22 which includes a propeller 23 having the plurality of blades 24 and a power system 26, and a pump system 34, as shown in FIG. 2. The power system 26 includes an electric motor 28 and a motor converter 30 that provides electrical power to the electric motor 28. In the illustrative embodiment, the pump system 34 is mechanically coupled to the propeller 23 and to the electric motor 28 such that any one of the propeller assembly 22 and electric motor 28 can drive the pump system 34.

In the event that the motor converter 30 exceeds a maximum tolerable temperature, the motor converter 30 will be shut down to prevent overheating. This excess temperature may be caused by a variety of factors, one of which is air bubbles in a coolant circuit 38 of the pump system 34 moving too slowly past a cooling plate 32 of the motor converter 30. In normal operating conditions, the pump system 34 is driven by the electric motor 28. As will be described in detail below, in the event the motor converter 30 overheats and shuts off, the propeller assembly 22 will drive the pump system 34 because of the mechanical connection between the propeller assembly 22 and the pump system 34. As a result, the pump system 34 continues to pump coolant through the cooling circuit 38 so as to move the air bubbles away from the cooling plate 32. Moving the air bubbles away from the cooling plate 32 allows the coolant fluid to continue removing heat from the cooling plate 32 efficiently to lower the temperature of the cooling plate 32, which subsequently lowers the temperature of the motor converter 30 such that it may be switched back on. The motor converter 30 may then resume supplying power to the electric motor 28 which may then power to the propeller 23.

The propeller 23 includes the plurality of blades 24 which are configured to rotate about a central axis 25 and provide propulsive power to the aircraft 10. The plurality of blades 24 are arranged circumferentially around the axis central axis 25 and extend radially outward away from the central axis 25.

In the illustrative embodiment, the power system 26 includes the electric motor 28 and the motor converter 30 electrically connected to the electric motor 28, as shown in FIG. 2. The electric motor 28 is mechanically coupled to the propeller assembly 22 so as to drive the blades 24 of the propeller 23. The electric motor 28 may be an electric motor known in the art that is utilized to convert supplied electrical energy into kinetic energy which is transferred to the blades 24 which rotate and provide propulsive power to the aircraft 10.

The motor converter 30 is electrically connected to the electric motor 28 and configured to deliver electric power to the electric motor 28, as shown in FIG. 2. In some embodiments, the motor converter 30 and the electric motor 28 may be integrated into a single unit. The motor converter 30 may be an converter known in the art that is utilized to regulate power supplied to the electric motor 28. The motor converter 30 is arranged between a power supply and the electric motor 28, and is configured to receive power from the power supply and convert DC current to AC current, AC current to DC current, and AC current to AC current that subsequently flows to the electric motor 28. In some embodiments, the motor converter 30 may regulate current returning from the motor to the power supply and/or modify the properties of the incoming and exiting current. The motor converter 30 may also adjust frequency and voltage of the power supplied to the electric motor 30 based on the current operating condition of the propulsion system 20.

In the illustrative embodiment, the motor converter 30 includes a plurality of converter switches 31 and a cooling plate 32, as shown in FIG. 2. The converter switches 31 are configured to convert an incoming power supply of electrical energy for example from AC power to DC power and from DC power to AC power. The cooling plate 32 is thermally engaged with the converter switches 31 and is configured to remove heat from the converter switches 31 so as to cool the switches 31. The coolant circuit 38 is in thermal communication with the cooling plate 32 in order to remove heat from the cooling plate 32 which subsequently removes heat from the converter switches 31. Thus, in response to the power system 26 being in a power-off arrangement in which the motor converter 30 has been shut off due to overheating, which will be described in detail below, the pump system 34 is configured to continue to pump coolant through the coolant circuit 38 so as to remove heat from the cooling plate 32 which subsequently removes heat from the converter switches 31 and allows the motor converter 30 to return to safe operating temperature.

Figure 3:
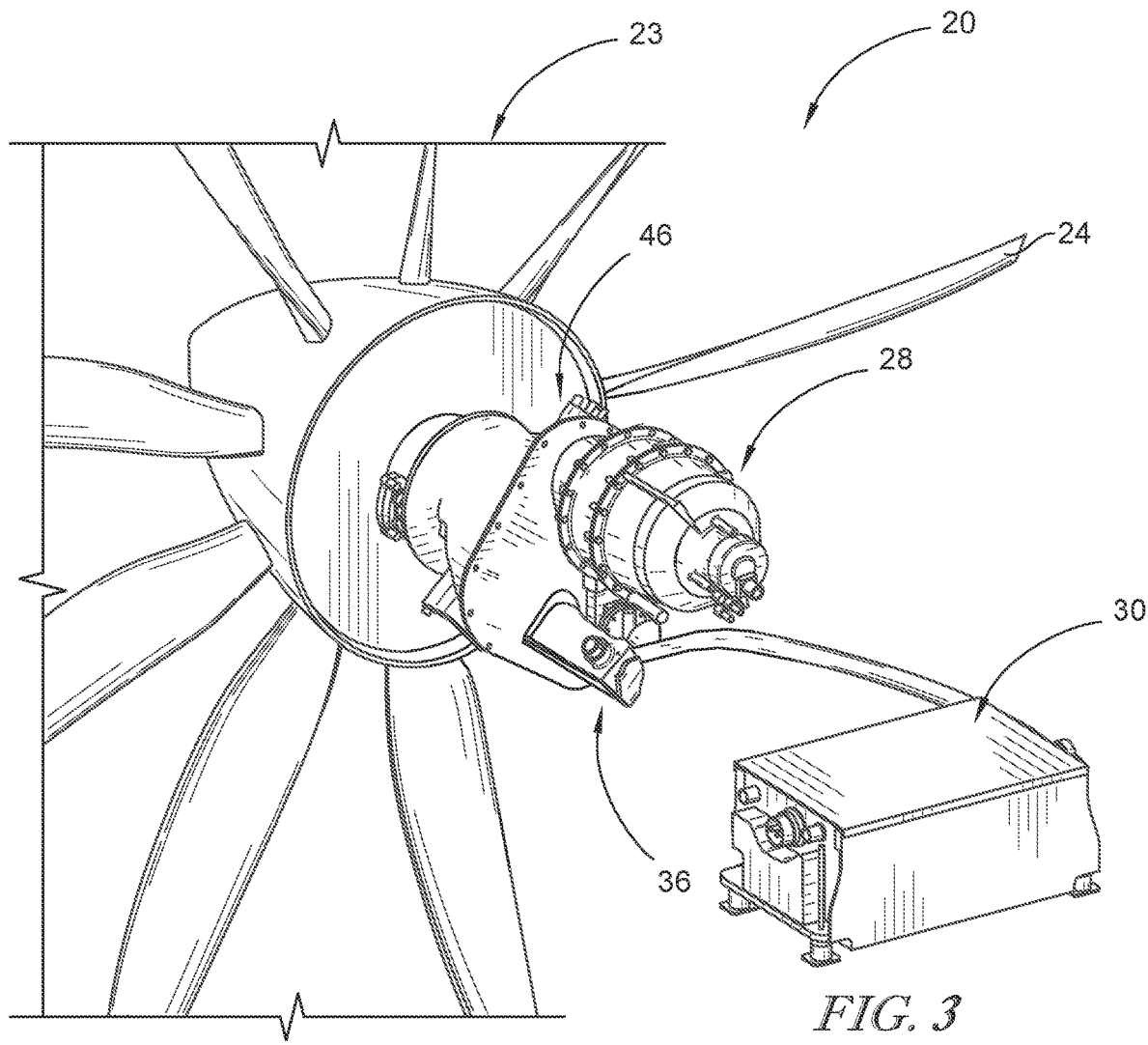
FIG. 3 is a perspective view of the propulsion system of FIG. 2, showing that the propulsion system includes the propeller, the electric motor, the motor converter, the pump system, and the gearbox mechanically coupled to the propeller and to the pump system.

The pump system 34 includes a pump 36 and the coolant circuit 38 that runs from the pump 36 to the motor converter 30 and back to the pump 38 in a fluid circuit among other possible locations. The pump 36 is configured to pump coolant through the motor converter 30 via the coolant circuit 38 so as to cool the motor converter 30. The pump 36 is mechanically coupled to both the propeller assembly 22 and to the electric motor 28 such that rotation of any one of the propeller 23 and the electric motor 28 drives the pump 36, as shown in FIGS. 2 and 3. Illustratively, the pump 36 is mechanically connected to the electric motor 28 and the propeller 23 via a gearbox 46. The coolant circuit 38 includes a coolant that is configured to conduct heat away from the relevant components, including the cooling plate 32 of the motor converter 30. The coolant may be, but is not limited to, a water/ethylene glycol mixture or a water and propylene mixture. In some embodiments, the pump 36 is configured to control the flow of coolant to be proportional to the rotational speed.

In the illustrative embodiment, the propulsion system 20 further includes the controller 42 connected to the power system 26, as shown in FIG. 2. In other embodiments, the power system 26, the converter 30, and the controller 42 may be integrated into a single unit. The controller 42 is configured to switch the power system 26 into the power-off arrangement in which the motor converter 30 is powered off and blocked from delivering the electric power to the electric motor 28 in response to a temperature of the motor converter 30 being greater than a predetermined threshold temperature. As discussed above, the temperature of the motor converter 30 may reach unsustainable levels in which the motor converter 30 must be shut down. This may be caused by a variety of factors, one of which is air bubbles that have accumulated throughout the coolant circuit 38 of the pump system 34 moving too slowly past the cooling plate 32 of the motor converter 30. In some scenarios, the air bubbles flowing through the coolant circuit 38 may be caused by the aircraft 10 executing negative G maneuvers (negative gravity maneuvers).

In the event that the controller 42 determines that the temperature of the motor converter 30, in particular the switches 31 of the motor converter 30, is too high (i.e. above the predetermined threshold temperature), the controller 42 will turn off the motor converter 30, in which the power system 26 is in the power-off arrangement. With the motor converter 30 being shut off, the electric motor 28 no longer receives power and does not power the propeller assembly 22. However, as will be discussed in detail below, the blades 24 of the propeller 23 continue to rotate due to the ambient air continuing to flow over the blades 24, sometimes called windmilling. This rotation of the propeller 23 continues to drive the pump 36 such that coolant continues to move through the coolant circuit 38. This permits the coolant to continue to lower the temperature of the motor converter 30 to less than the threshold temperature, in which case the motor converter 30 may be turned back on and normal operation of the propulsion system 20 may resume.

In some embodiments, the controller 42 may be configured to determine that the temperature of the motor converter 30 has been lowered to below the threshold temperature. In response to determining that the temperature is below the threshold temperature, the controller 42 is configured to switch the power system 26 into a power-on arrangement in which the motor converter 30 is powered back on such that the pump 36 is driven by at least the electric motor 28 such that coolant continues to pump through the coolant circuit 38. In other embodiments, the controller 42 of the propulsion system 20 may generate an alert for a pilot of the aircraft 10 via an alert system indicating that the temperature of motor converter 30 has returned back below the threshold temperature, and the pilot may then manually power the motor converter 30 back on.

The controller 42 may include at least one processor connected to a computer readable memory and/or other data storage. Computer executable instructions and data used by a processor may be stored in the computer readable memory included in an onboard computing device, a remote server, a combination of both, or implemented with any combination of read only memory modules or random access memory modules, optionally including both volatile and nonvolatile memory.

In the illustrative embodiment, the pump system 34 further includes an expansion tank 39 that is arranged in fluidic communication with the coolant circuit 38, as shown in FIG. 2. The pump system 34 is configured to, in response to the air bubbles accumulating within the coolant circuit 38 and moving at a reduced speed past the cooling plate 32, move the air bubbles through the coolant circuit 38 away from the cooling plate 32 and into the expansion tank 39.

Figure 5:
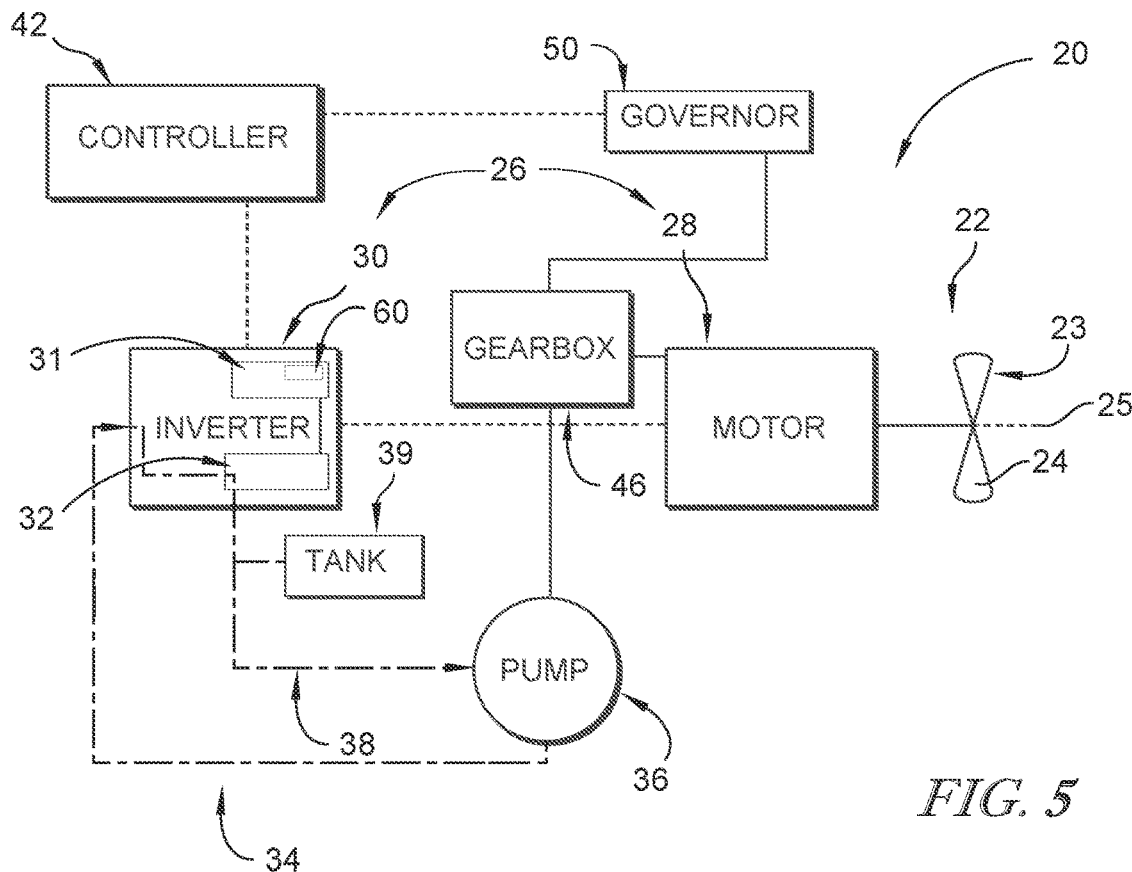
FIG. 5 is a block diagram of a propulsion system of an aircraft according to a further aspect of the present disclosure, showing that the propulsion system includes a propeller, a power system including an electric motor mechanically coupled to the propeller and electrically connected with a motor converter, a pump system including a pump and a coolant circuit that cools the motor converter and that is configured to be mechanically driven by at least one of the motor and the propeller, an accessory gearbox, and a controller configured to control the converter.
Figure 6:
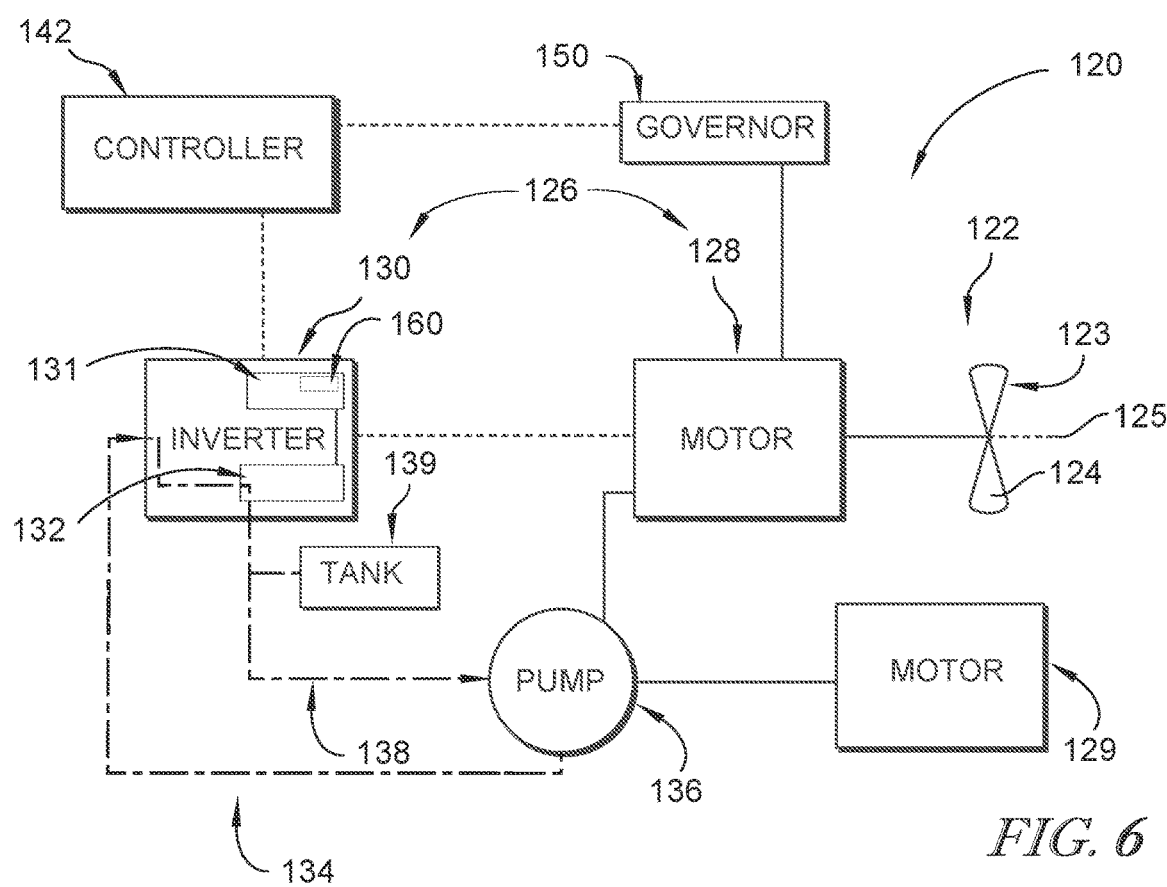
FIG. 6 is a block diagram of a propulsion system of an aircraft according to a further aspect of the present disclosure, showing that the propulsion system includes a propeller, a power system including an electric motor mechanically coupled to the propeller, a motor converter, and a second electric motor, a pump system including a pump and a coolant circuit that cools the motor converter and that is configured to be driven by at least one of the first and second motors, and a controller configured to control the converter.
Figure 7:
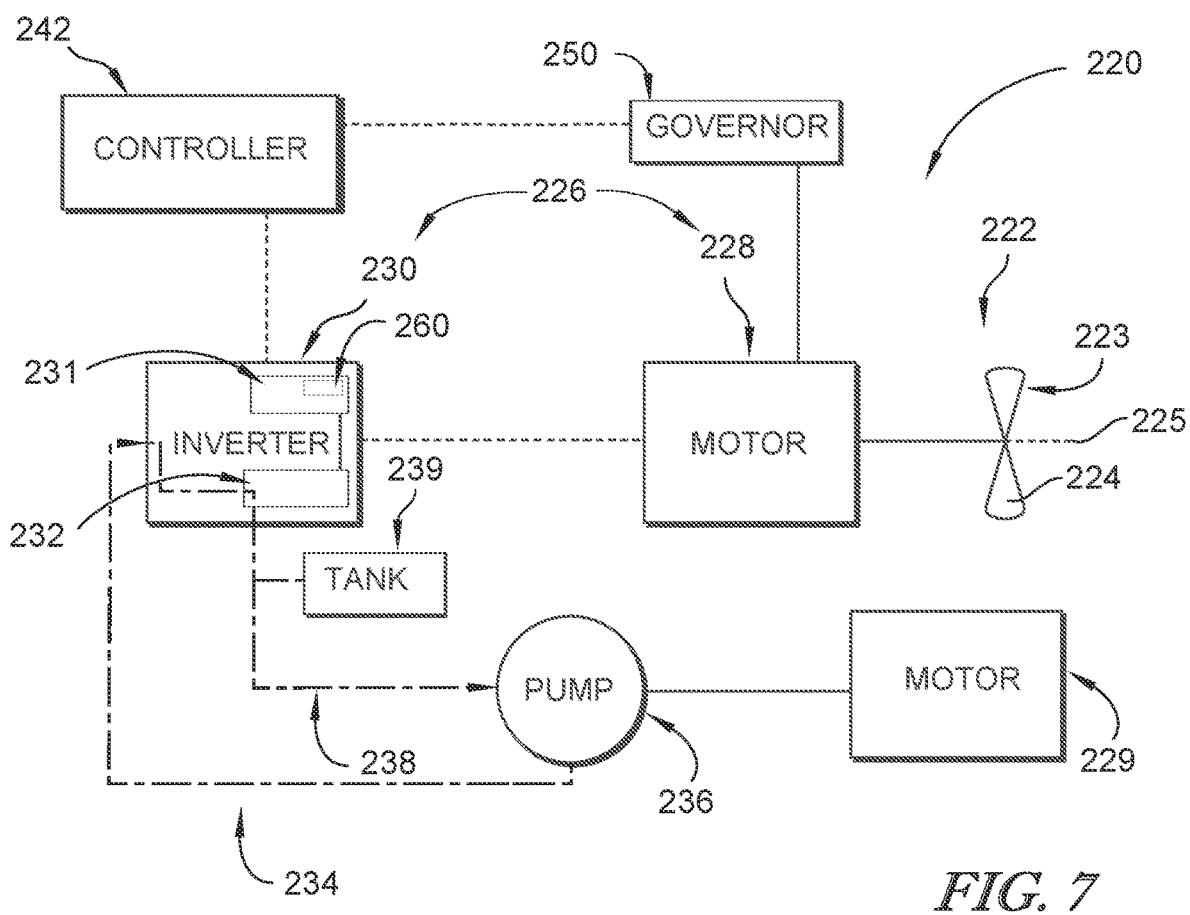
FIG. 7 is a block diagram of a propulsion system of an aircraft according to a further aspect of the present disclosure, showing that the propulsion system includes a propeller, a power system including an electric motor mechanically coupled to the propeller, a motor converter, and a second electric motor, a pump system including a pump and a coolant circuit that cools the motor converter and that is configured to be driven by the second motor, and a controller configured to control the converter.

In some embodiments, the propulsion system 20 further includes the gearbox 46 mechanically coupled to the propeller 23 and to the pump system 34, as shown in FIG. 2. The gearbox 46 is configured to transfer mechanical energy from the propeller 23 to the pump 36 of the pump system 34 so as to drive the pump in the event that the motor converter 30 is powered off. In other embodiments, as shown in FIG. 5, an accessory gearbox 46 is operably connected with the pump 36, the governor 50, and the motor 28. The motor 28 is directly connected to the propeller 23. In other embodiments, as shown in FIGS. 6 and 7, a gearbox may be omitted, and the governor 150 is operably connected to the motor 128 which is directly connected to the propeller 123.

Figure 4:
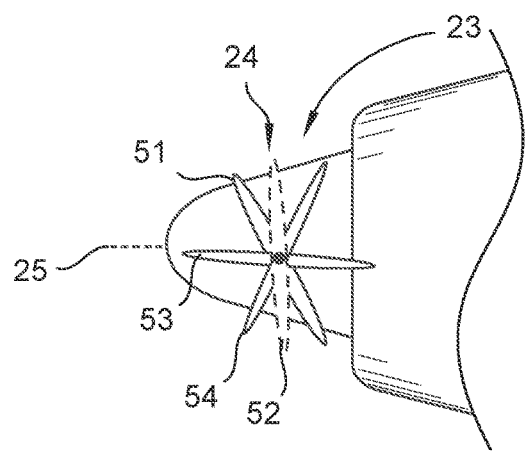
FIG. 4 is a top diagrammatic view of a single propeller blade of the propulsion system of FIG. 2, showing various pitch angles available to the plurality of blades of the propeller that a propeller governor may move the blades.

In the illustrative embodiment, the propeller assembly 22 further includes a propeller governor 50 configured to control a pitch angle of the plurality of blades 24 as shown in FIGS. 2 and 4. The propeller governor 50 may be any propeller governor known in the art that is utilized to regulate the rotational speed of the propeller 23 by moving fluid to and from the propeller which alters the pitch of the blades 24.

In some embodiments, the propeller governor 50 is configured to rotate the plurality of blades 24 of the propeller 23 from a first pitch angle to a second pitch angle different from the first pitch angle in response to the motor converter 30 being shut off. As shown in FIG. 4, the propeller governor 50 may be configured to rotate the plurality of blades 24 to any pitch angle of 0 degrees to 180 degrees relative to the plane of rotation about the central axis 25. For example, as shown in FIG. 4, the propeller governor 50 may rotate the blades 24 to a positions 51, 52, 53, 54 which may be useful for various operating conditions of the aircraft. In the illustrative embodiment, in response to the motor converter 30 overheating, the governor 50 adjusts the blade angle to allow for the propeller 23 to continue to rotate for a maximum amount of time, thus allowing for a maximum amount of time for the air bubbles to clear the cooling plate 32 and for the temperature of the motor converter 30, in particular the temperature of the converter switches 31, to return to below the threshold temperature.

It should be understood that in other embodiments, the propeller assembly 22 may include fixed pitch propeller blades 24 and thus would not utilize a propeller governor 50. In such an embodiment, the fixed propeller blades 24 could be utilized so long as the blades 24 allow the propeller 23 to continue to rotate after motor 30 shutdown for a long enough period of time to allow for the air bubbles to clear the coolant circuit 38.

In some embodiments, the motor converter 30 further includes at least one temperature sensor 60 located proximate to the plurality of converter switches 31 as shown in FIG. 2. The temperature sensor 60 is configured to monitor a switch temperature of the plurality of converter switches 31 and relay the temperature to the controller 42 for execution of the above-described processes. It is noted that, in the illustrative embodiment, the temperature of the motor converter 30 utilized by the controller 42 for determination of whether the motor converter 30 should be shut off is the switch temperature of the plurality of converter switches 31. Moreover, the predetermined threshold temperature utilized by the controller 42 for determination of whether the motor converter 30 should be shut off is a predetermined threshold switch temperature of the plurality of converter switches 31.

In the illustrative embodiment, the predetermined threshold temperature of the plurality of converter switches 31 is 150 degrees Celsius.

Another embodiment of a propulsion system 120 which may be utilized in the aircraft 10 in accordance with the present disclosure is shown in FIG. 6. The propulsion system 120 is substantially similar to the propulsion system 20 shown in FIGS. 1-5 and described herein. Accordingly, similar reference numbers in the 100 series indicate features that are common between the propulsion system 120 and the propulsion system 20. The description of the propulsion system 20 is incorporated by reference to apply to the propulsion system 120, except in instances when it conflicts with the specific description and the drawings of the propulsion system 120.

Similar to the propulsion system 20, the propulsion system 120 includes a propeller assembly 122 that includes a propeller 123 having a plurality of blades 124 and configured to rotate around a central axis 125, and a power system 126, as shown in FIG. 6. The power system 126 includes an electric first motor 128 mechanically coupled to the propeller 123 and configured to drive rotation of the propeller 123, and a motor converter 130 electrically connected to the electric first motor 128 and configured to deliver electric power to the electric first motor 128.

The propulsion system 120 further includes a controller 142 connected to the power system 126 and configured to switch the power system into a power-off arrangement in which the motor converter 130 is powered off and blocked from delivering the electric power to the electric first motor 128, as shown in FIG. 6. The controller 142 is configured to make the switch to the power-off arrangement in response to a temperature of the motor converter 130 being greater than a predetermined threshold temperature. In some embodiments, the motor converter 130 includes a plurality of converter switches 131 and a cooling plate 132 engaged with the converter switches 131 so as to cool the switches 131. A temperature sensor 160 may be operably engaged with the converter switches 131 to monitor a temperature of the switches 131 and relay the temperature to the controller 142. In some embodiments, the propulsion system 120 further includes a propeller governor 150.

The propulsion system 120 further includes a pump system 134 including a pump 136 and a coolant circuit 138, as shown in FIG. 6. The coolant circuit 138 is configured to remove heat from the motor converter 130. The pump 136 is configured to pump coolant through the coolant circuit 138, and is mechanically coupled to the propeller 123 and to the electric first motor 128 such that rotation of any one of the propeller 123 and the electric first motor 128 drives the pump 136. In some embodiments, the pump system 134 may further include an expansion tank 139 in fluidic communication with the coolant circuit 138.

As opposed to the propulsion system 20, the propulsion system 120 further includes a second motor 129 operably connected to the pump 136 and configured to drive the pump 136, as shown in FIG. 6. The second motor 129 is powered independent of the motor converter 130 such that, in the event of a shutdown of the motor converter 130, the second motor 129 may be utilized to power the pump 136 along with the propeller 123 or by itself and without assistance from the propeller 123. In the illustrative embodiment, in response to the motor converter 130 being shut down, the controller 142 is configured to instruct the second motor 129, which may already be operating, to continue to provide power to the pump 136 such that the pump 136 continues to function. In some embodiments, the second motor 129 is an electric motor. In other embodiments, the second motor 129 may be mechanically driven, for example, via a shaft and gearbox assembly.

Another embodiment of a propulsion system 220 which may be utilized in the aircraft 10 in accordance with the present disclosure is shown in FIG. 7. The propulsion system 220 is substantially similar to the propulsion systems 20, 120 shown in FIGS. 1-6 and described herein. Accordingly, similar reference numbers in the 200 series indicate features that are common between the propulsion system 220 and the propulsion systems 20, 120. The description of the propulsion systems 20, 120 are incorporated by reference to apply to the propulsion system 220, except in instances when it conflicts with the specific description and the drawings of the propulsion system 220.

Similar to the propulsion systems 20, 120, the propulsion system 120 includes a propeller assembly 222 that includes a propeller 223 having a plurality of blades 224 and configured to rotate around a central axis 225, and a power system 226, as shown in FIG. 7. The power system 226 includes an electric first motor 228 mechanically coupled to the propeller 223 and configured to drive rotation of the propeller 223, and a motor converter 230 electrically connected to the electric first motor 228 and configured to deliver electric power to the electric first motor 228.

The propulsion system 220 further includes a controller 242 connected to the power system 226 and configured to switch the power system into a power-off arrangement in which the motor converter 230 is powered off and blocked from delivering the electric power to the electric first motor 228, as shown in FIG. 7. The controller 242 is configured to make the switch to the power-off arrangement in response to a temperature of the motor converter 230 being greater than a predetermined threshold temperature. In some embodiments, the motor converter 230 includes a plurality of converter switches 231 and a cooling plate 232 engaged with the converter switches 231 so as to cool the switches 231. A temperature sensor 260 may be operably engaged with the converter switches 231 to monitor a temperature of the switches 231 and relay the temperature to the controller 242. In some embodiments, the propulsion system 120 further includes a propeller governor 250.

The propulsion system 220 further includes a pump system 234 including a pump 236 and a coolant circuit 238, as shown in FIG. 7. The coolant circuit 238 is configured to remove heat from the motor converter 230. The pump 236 is configured to pump coolant through the coolant circuit 238. The propulsion system 220 further includes a second motor 229 operably connected to the pump 236 and configured to drive the pump 236. The second motor 229 is powered independent of the motor converter 230 such that, in the event of a shutdown of the motor converter 230, the second motor 229 may be utilized to power the pump 236. As opposed to the propulsion system 120, the pump 236 is not connected to the motor 230 or the propeller 223 such that the second motor 229 is the only source of power for the pump 236. In this way, in response to the motor converter 230 being shut down, the controller 242 is configured to instruct the second motor 229, which may already be operating, to continue to provide power to the pump 236 such that the pump 236 continues to function. In some embodiments, the second motor 129 is an electric motor. In other embodiments, the second motor 229 may be mechanically driven, for example, via a shaft and gearbox assembly.

A method according to another aspect of the present disclosure includes a first operation of providing a propeller configured to rotate around a central axis and a power system, the power system including an electric motor and a motor converter. The method includes a second operation of mechanically coupling the electric motor to the propeller, the electric motor being configured to drive the propeller. The method includes a third operation of electrically connecting the motor converter to the electric motor. The method includes a fourth operation of providing a pump system including a pump and a coolant circuit. The method includes a fifth operation of mechanically coupling the pump to the propeller and to the electric motor such that at least one of the propeller and the electric motor drives the pump.

The method includes a sixth operation of pumping, via the pump, coolant through the motor converter via the coolant circuit so as to cool the motor converter. The method includes a seventh operation of determining that a temperature of the motor converter is greater than a predetermined threshold temperature. The method includes an eighth operation of switching the power system into a power-off arrangement in which the electric motor and the motor converter are powered off. The method includes a ninth operation of driving the pump via only the propeller such that coolant continues to pump through the coolant circuit in order to lower the temperature of the motor converter to less than the predetermined threshold temperature during operation of the propulsion system.

In some embodiments, the method further includes an additional operation of determining that the temperature of the motor converter is less than the predetermined threshold temperature. The method may further include an additional operation of switching the power system into a power-on arrangement in which the motor converter is powered on. The method may further include an additional operation of driving the pump via at least the electric motor such that coolant continues to pump through the coolant circuit.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system for an aircraft, the propulsion system comprising
    a propeller assembly that includes a propeller configured to rotate around a central axis and a power system, the power system including an electric motor mechanically coupled to the propeller and configured to drive the propeller, and a motor converter electrically connected to the electric motor and configured to deliver electric power to the electric motor,
    a controller connected to the power system and configured to switch the power system from a power-on arrangement in which the motor converter is powered on into a power-off arrangement in which the electric motor and the motor converter are powered off and the motor converter is blocked from delivering the electric power to the electric motor in response to a temperature of the motor converter being greater than a predetermined threshold temperature, and
    a pump system including a pump and a coolant circuit, the pump configured to pump coolant through the motor converter via the coolant circuit so as to cool the motor converter, the pump being mechanically coupled to the propeller and to the electric motor such that rotation of any one of the propeller and the electric motor drives the pump such that rotation of the propeller drives the pump to move the coolant through the coolant circuit and lower the temperature of the motor converter to less than the predetermined threshold temperature in response to the motor converter being in the power-off arrangement during operation of the propulsion system.

2. The propulsion system of claim 1, wherein the motor converter includes a plurality of converter switches configured to regulate incoming and outgoing current and a cooling plate thermally engaged with the plurality of converter switches and configured to remove heat from the plurality of converter switches, wherein the coolant circuit is arranged so as to thermally engage with the cooling plate in order to remove heat from the cooling plate which subsequently removes heat from the plurality of converter switches, and wherein, in response to the power system being in the power-off arrangement, the pump system is configured to pump the coolant through the coolant circuit so as to remove heat from the cooling plate which subsequently removes heat from the plurality of converter switches.

3. The propulsion system of claim 2, wherein the pump system further includes an expansion tank in fluidic communication with the coolant circuit, and wherein the pump system is configured to, in response to air bubbles accumulating within the coolant circuit and moving at a reduced speed past the cooling plate, move the air bubbles through the coolant circuit away from the cooling plate and into the expansion tank.

4. The propulsion system of claim 3, wherein the motor converter further includes at least one temperature sensor located proximate the plurality of converter switches so as to monitor a temperature of the plurality of converter switches.

5. The propulsion system of claim 4, wherein the temperature of the motor converter utilized by the controller is the temperature of the plurality of converter switches, and wherein the predetermined threshold temperature utilized by the controller is a predetermined threshold temperature of the plurality of converter switches.

6. The propulsion system of claim 5, wherein the predetermined threshold temperature of the plurality of converter switches is 150 degrees Celsius.

7. The propulsion system of claim 1, wherein the propeller includes a plurality of blades and the propeller assembly further includes a propeller governor configured to control a pitch angle of the plurality of blades, wherein, in response to the controller switching the power system into the power-off arrangement, the propeller governor is configured to change the pitch angle of the plurality of blades of the propeller from a first pitch angle to a second pitch angle different from the first pitch angle.

8. The propulsion system of claim 7, wherein the second pitch angle enables the propeller to continue to rotate at a maximum rotational speed in the power-off arrangement so as to continue to drive the pump for a maximum amount of time.

9. The propulsion system of claim 1, further comprising:
    a gearbox mechanically coupled to the propeller and to the pump system and the gearbox is configured to transfer mechanical energy from the propeller to the pump of the pump system so as to drive the pump.

10. The propulsion system of claim 1, wherein the coolant is one of a water and ethylene glycol mixture and a water and propylene mixture.

11. The propulsion system of claim 1, wherein the pump is a positive displacement pump configured to provide a constant flow of coolant in response to a constant rotational speed of the propeller.

12. A propulsion system for an aircraft, the propulsion system comprising
a propeller assembly that includes a propeller configured to rotate around a central axis and a power system, the power system including an electric first motor mechanically coupled to the propeller and configured to drive rotation of the propeller, and a motor converter electrically connected to the electric first motor and configured to deliver electric power to the electric first motor,
a controller connected to the power system and configured to switch the power system from a power-on arrangement in which the motor converter is powered on into a power-off arrangement in which the electric first motor and the motor converter are powered off and the motor converter is blocked from delivering the electric power to the electric first motor in response to a temperature of the motor converter being greater than a predetermined threshold temperature, and
a pump system including a pump and a coolant circuit, the coolant circuit configured to remove heat from the motor converter, the pump configured to pump coolant through the coolant circuit.

13. The propulsion system of claim 12, wherein the power system further includes a second motor operably connected to the pump and configured to drive the pump, and wherein the second motor is driven independent of the motor converter.

14. The propulsion system of claim 12, wherein the motor converter includes a plurality of converter switches configured to regulate incoming and outgoing current and a cooling plate thermally engaged with the plurality of converter switches and configured to remove heat from the plurality of converter switches, wherein the coolant circuit is arranged so as to thermally engage with the cooling plate in order to remove heat from the cooling plate which subsequently removes heat from the plurality of converter switches, and wherein, in response to the power system being in the power-off arrangement, the pump system is configured to pump the coolant through the coolant circuit so as to remove heat from the cooling plate which subsequently removes heat from the plurality of converter switches.

15. The propulsion system of claim 14, wherein the pump system further includes an expansion tank in fluidic communication with the coolant circuit, and wherein the pump system is configured to, in response to air bubbles accumulating within the coolant circuit and moving at a reduced speed past the cooling plate, move the air bubbles through the coolant circuit away from the cooling plate and into the expansion tank.

16. The propulsion system of claim 15, wherein the motor converter further includes at least one temperature sensor located proximate the plurality of converter switches so as to monitor a temperature of the plurality of converter switches.

17. The propulsion system of claim 16, wherein the temperature of the motor converter utilized by the controller is the temperature of the plurality of converter switches, and wherein the predetermined threshold temperature utilized by the controller is a predetermined threshold temperature of the plurality of converter switches.

18. The propulsion system of claim 17, wherein the predetermined threshold temperature of the plurality of converter switches is 150 degrees Celsius.

19. A method comprising
providing a propeller assembly including a propeller and a power system, the propeller configured to rotate around a central axis, the power system including an electric motor and a motor converter,
mechanically coupling the electric motor to the propeller, the electric motor being configured to drive the propeller,
electrically connecting the motor converter to the electric motor,
providing a pump system including a pump and a coolant circuit,
mechanically coupling the pump to the propeller and to the electric motor such that at least one of the propeller and the electric motor drives the pump,
pumping, via the pump, coolant through the motor converter via the coolant circuit so as to cool the motor converter,
determining that a temperature of the motor converter is greater than a predetermined threshold temperature,
switching the power system from a power-on arrangement in which the motor converter is powered on into a power-off arrangement in which the electric motor and the motor converter are powered off, and
driving the pump via only the propeller such that the coolant continues to pump through the coolant circuit in order to lower the temperature of the motor converter to less than the predetermined threshold temperature during operation of the propulsion system.

20. The method of claim 19, further comprising:
determining that the temperature of the motor converter is less than the predetermined threshold temperature,
switching the power system into the power-on arrangement in which the motor converter is powered on, and
driving the pump via at least the electric motor such that the coolant continues to pump through the coolant circuit.

* * * * *